US 8,868,471 B1

(12) United States Patent
Hullender (10) Patent No.: US 8,868,471 B1
(45) Date of Patent: Oct. 21, 2014

(54) EVALUATION OF TASK JUDGING RESULTS

(75) Inventor: Gregory N. Hullender, Seattle, WA (US)

(73) Assignee: Amazon Technologies, Inc., Reno, NV (US)

(*) Notice: Subject to any disclaimer, the term of this patent is extended or adjusted under 35 U.S.C. 154(b) by 398 days.

(21) Appl. No.: 13/239,275

(22) Filed: Sep. 21, 2011

(51) Int. Cl.
G06F 17/10 (2006.01)
G06F 9/00 (2006.01)
G05B 11/00 (2006.01)
G05B 17/00 (2006.01)

(52) U.S. Cl.
USPC ............................ 706/12; 706/21; 706/23

(58) Field of Classification Search
USPC ............................................. 706/12
See application file for complete search history.

(56) References Cited

U.S. PATENT DOCUMENTS

| | | | |
|---|---|---|---|
| 6,879,718 B2 * | 4/2005 | Hullender | 382/187 |
| 7,181,067 B2 | 2/2007 | Hullender | |
| 7,197,459 B1 | 3/2007 | Harinarayan et al. | |
| 7,801,756 B1 | 9/2010 | Harinarayan et al. | |

OTHER PUBLICATIONS

Peng, Fuchun, et al., "Chinese Segmentation and New Word Detection Using Conditional Random Fields", Computer Science Department Faculty Publications Series, Paper 92, University of Massachusetts, Amherst, 2004, 8 pages.
Raina, Rajat et al., "Self-Taught Learning: Transfer Learning From Unlabeled Data", Proceedings of the 24th International Conference on Machine Learning, Corvallis, Oregon, 2007, 8 pages.
Novotney, Scott et al., "Cheap, Fast and Good Enough: Automatic Speech Recognition With Non-Expert Transcription", in Human Language Technologies: The 2010 Annual Conference of the North American Chapter of the Association for Computational Linguistics, Jun. 2010, 9 pages.

* cited by examiner

*Primary Examiner* — Jeffrey A Gaffin
*Assistant Examiner* — Nathan Brown, Jr.
(74) *Attorney, Agent, or Firm* — Knobbe, Martens, Olson & Bear, LLP (57) ABSTRACT

Embodiments of systems and methods can determine evaluations of the quality of task results provided by judges. Certain embodiments can determine the quality evaluations with relatively little overlap of judges (e.g., two or three judges). The quality evaluations may include determining an error rate or a confidence index for a judge or for a particular judgment made by the judge. Certain embodiments may determine the quality evaluations by intercomparing judging results from multiple judges without requiring human intervention, comparison to evaluation data known (or assumed) to be accurate, or input from an external judge review panel. In some implementations, task results can be combined with a confidence score (based at least in part on the quality evaluation of the judge who provided the task result), and this information can be used as training data to improve performance of machine learning algorithms.

19 Claims, 4 Drawing Sheets

EVALUATION OF TASK JUDGING RESULTS

BACKGROUND

Computer systems can be programmed to automate tasks that may be based on algorithms, flowcharts, equations, formulas, logical expressions, and so forth. The tasks may be expressed as programming instructions that are executed by the computer system. Larger tasks often can be reduced to a set of smaller computer-programmable tasks.

However, some tasks can be difficult for a computer system to perform. For example, pattern recognition, speech or handwriting recognition, image comparison, and Asian language word segmentation can be challenging to automate on a computer system and may require highly complex algorithms that take significant amounts of time to execute on the computer system. Such tasks, however, may be readily performed by humans in many cases. For example, it may be straightforward for a human to describe the differences or similarities between two images, yet very difficult for a computer system to be programmed to perform the same task.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

I. Overview

For certain tasks that can be computationally challenging to automate, human judges may reach results with relatively high levels of speed and/or accuracy. For example, some complex problems can be broken down into a set of tasks that can be posed as questions to the judge for which the answer is a choice between binary options, e.g., "yes" or "no", "true" or "false", is an item "blue" or "yellow", is an image of an "elephant" or a "rhinoceros", and so forth.

As one illustrative example, some Asian languages do not delimit lexical tokens or "words" by white space. Word segmentation of an unsegmented Asian language phrase can be a precursor to further language processing tasks. For example, a block of Asian characters representing a title of an item (e.g., a book) available from an electronic catalog system may be segmented before an item detail page (e.g., a web page) that displays the title can be generated. Asian language word segmentation is a challenging computational problem in part due to the lack of standard definitions of word boundaries in these languages. However, human judges may be able to segment a block of Asian characters containing no white space relatively quickly and efficiently. For example, the block of characters may be displayed to the judge via a user interface, and the judge may move a cursor along the block of characters. At any point, the judge can indicate a word break by actuating an input on the user interface, e.g., by pressing a particular key on a keyboard. The result of this example task is a yes/no judgment at each cursor position for whether there is a word break in the block of characters.

In other problems, there may be more than two possible results for a task, e.g., the task may be to determine the color of a an article of footware (e.g., a shoe), and the choice of results may include "black", "brown", "beige", "red", "navy", "white", or "saddle". Other types of results are possible for other types of tasks.

Human judges may make mistakes (honest or intentional) and may make different judgments on the same task when presented with it at different times or under different conditions. Therefore, certain task result judging systems may have multiple judges (e.g., five, ten, twelve, or more) make a judgment on a given item and then determine a final judgment based on the combined results from the multiple judges. However, not only can this be inefficient (because many judges view the same item) but the final judgment may be subject to error because there may be no way to determine whether "good" judges (e.g., those who provide accurate and reproducible results) or "poor" judges (e.g., those who provide inaccurate or irreproducible results) have submitted a judgment on the item.

Accordingly, certain embodiments of the systems and methods disclosed herein can determine evaluations of the quality of the task results provided by judges. Certain such embodiments can determine the quality evaluations with relatively little overlap of judges (e.g., two or three judges). The quality evaluations may include determining an error rate or a confidence index for a judge or for a particular judgment made by the judge. Certain embodiments may determine the quality evaluations by comparing judging results from multiple judges without requiring comparison of the judging results to training data that is known (or assumed) to be accurate or "true." Various embodiments may be used to evaluate the quality of judges (e.g., by determining one or more quality metrics), determine how to compensate judges, or determine which judges to remove or replace. Additionally, in some implementations, task results can be combined with a confidence score (based on the quality evaluation of the judge who provided the task result), and this information can be used as training data for machine learning algorithms (e.g., supervised or semi-supervised learning) to improve the performance of the machine learning algorithm.

As will be further described below, certain examples of the task result judging systems and methods will be described in the context of tasks performed for an electronic catalog or e-commerce system. These examples are intended to be illustrative and not limiting. For example, embodiments of the systems and methods can be used with any system in which certain tasks are outsourced to humans, e.g., crowdsourcing systems, collaborative innovation networks, human-based computation systems, marketplaces for human intelligence tasks (e.g., Mechanical Turk®), and so forth.

Further, although certain illustrative examples will be described in which the judges of certain tasks are human, this is not a limitation. Embodiments of the systems and methods can be used to evaluate task results made by machines. For example, the task results may be generated as the output of an artificial intelligence program executed by a computer system. Examples of artificial intelligence programs can include machine learning, neural networks, Markov models, support vector machines, Bayesian networks, control theory, and so forth. Therefore, the task results received for evaluation can come from humans, from machines, or from a combination of humans and machines.

II. Example Tasks for an Electronic Catalog System

Figure 1:
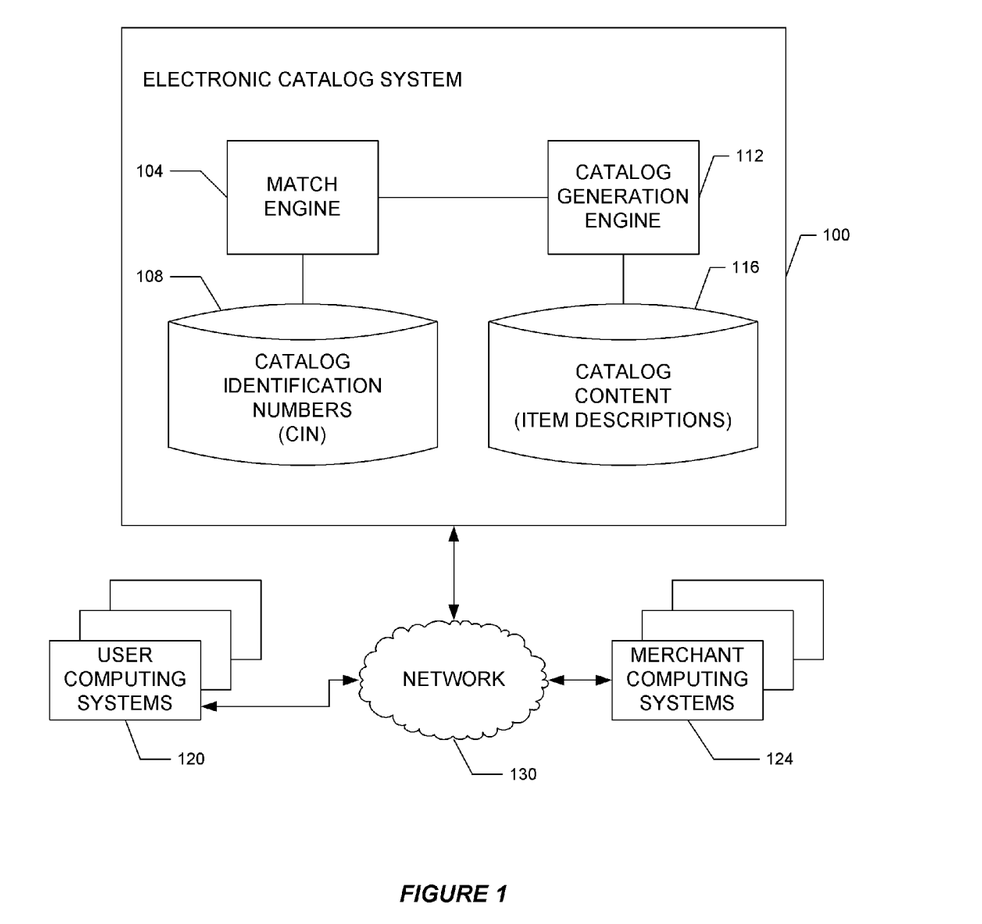
FIG. 1 is a block diagram that schematically illustrates an example of an electronic catalog system that includes a catalog of items available for selection by customers of the catalog system. The catalog system may include functionality to determine whether items available from merchants match currently available items or are new items.

FIG. 1 is a block diagram that schematically illustrates an example of an electronic catalog system 100 that includes a catalog of items available for selection by customers of the catalog system. The electronic catalog system 100 may include functionality to determine whether items available from merchants match currently available items or are new items. As will be discussed, human judges may be used, at least in part, to determine whether items match or are new items.

The electronic catalog system 100 may be implemented as a computerized system that comprises multiple programmed computing devices (e.g., web server machines, application servers, storage servers, load balancers, etc.) that communicate over one or more networks. The electronic catalog system 100 can host a web site that provides functionality for users to browse an electronic catalog of items that are available for purchase. The items represented in the catalog may include, for example, physical products (e.g., books, electronics, hardware, apparel, etc.), music downloads, video downloads, electronic books (e.g., eBooks), software applications, magazine subscriptions, mobile service plans, and other types of items that can be purchased, rented, leased, etc. Although described in the context of a web site, the system 100 can also be implemented in other types of interactive systems, including interactive television systems. Further, although described in the context of products that are available for purchase, the disclosed features are also applicable to other types of items, including services, news articles, blogs, web sites, and television shows.

The electronic catalog system 100 can include one or more web servers that respond to page requests received over a network 130 from user computing systems 120 (e.g., personal computers, portable computing devices, mobile phones, electronic book readers, PDAs, etc.) of end users. The network 130 may be a global communications network (e.g., the internet), a wide area network, a local area network, or another data network. The system 100 also includes a repository of catalog content 116. The catalog content 116 may include, for example, product images, product descriptions, user ratings and reviews of particular products, price and availability data, seller data, etc. A search engine (not shown) enables users to search the catalog by submitting free-form search strings. The system 100 can include one or more catalog generation engines 112 for customizing or personalizing the appearance or content of a display page presented to a user of the system 100. For example, a display page can include a web page that is displayed by a web browser (or other user interface) when a user visits the web site hosted by the electronic catalog system 100. Such customized or personalized display pages can include a home or login page (when the user first accesses the website), detail pages for specific items in the electronic catalog, search pages that allow users to search for desired items or services, or recommendation pages that are generated in response to a user's request for recommendations. Display pages can also include popup pages, popovers, hover pages, and so forth that are presented when a user views a web page.

In this example, merchants who wish to make an item (e.g., a product or service) available for acquisition via the electronic catalog system 100 can submit information about the item using merchant computing systems 124. The merchant information may include an item identifier for each item, e.g., a stock keeping unit ("SKU"). The electronic catalog system 100 can maintain a data repository 108 that stores catalog identification numbers ("CIN") for each item available from the electronic catalog system 100. In some cases, the SKU maintained by the merchant and the CIN maintained by the catalog system may be substantially identical or include substantially the same information (e.g., for a book, both may include the International Standard Book Number (ISBN)). In other cases, the CIN and the SKU may be quite different in content or format.

The electronic catalog system 100 can include a match engine 104 configured to determine whether item information submitted by a merchant matches an existing item in the catalog. For example, the match engine 104 can determine whether an item's SKU matches a CIN for an existing product. If a match is found, the item information can be added to the catalog content repository 116 for display on an item detail page. For example, the item detail page may indicate that the item is available from the merchant and may also indicate the price and number of such items available from the merchant. If a match is not found by the match engine 104, the item information can be used by the catalog generation engine 112 to generate a new display page for the item, thereby enabling users of the system 100 to acquire the item from the merchant.

Figure 2:
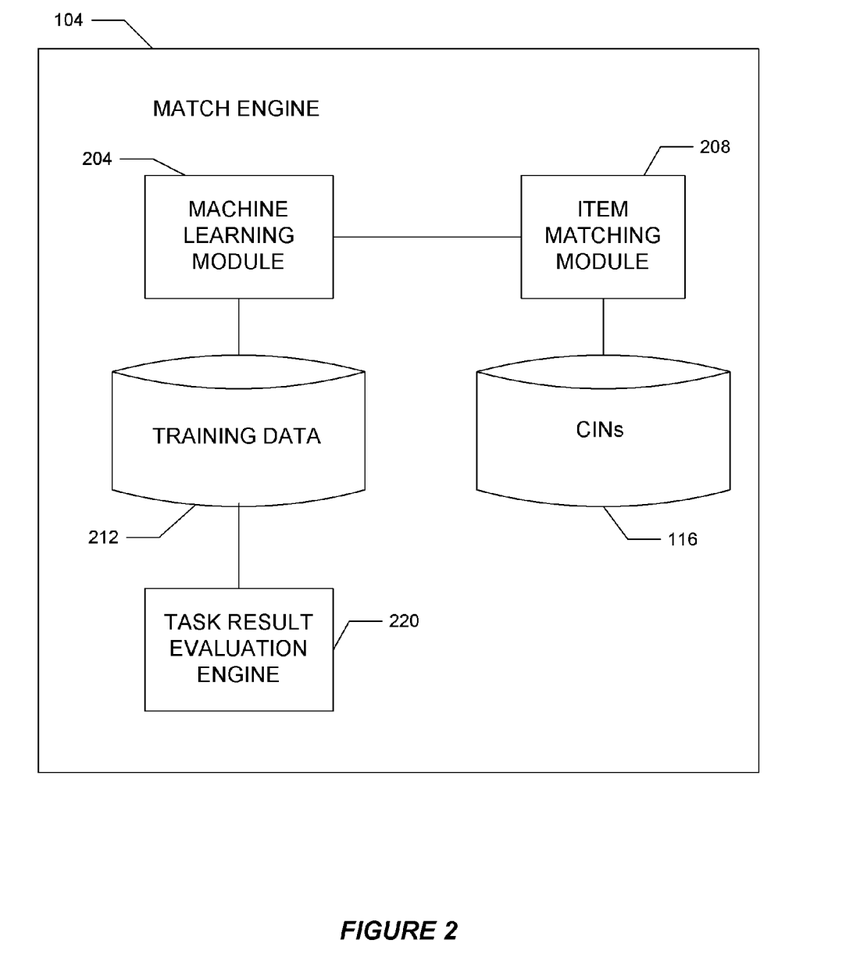
FIG. 2 is a block diagram that schematically illustrates an example of a match engine that automatically compares merchant items with electronic catalog content to determine whether a merchant item represents a currently available item or is a new item.

FIG. 2 is a block diagram that schematically illustrates an example of a match engine 104 that automatically compares merchant item submissions with electronic catalog content to determine whether a merchant item represents a currently available item or is a new item. The match engine 104 can include an item matching module 208 that automatically compares the merchant item information (e.g., SKU) with item description information (e.g., CIN) to determine whether a match is found with an existing item available from the catalog system 100. In this example, the match engine 104 includes a machine learning module 204 that implements a machine learning algorithm (e.g., supervised or semi-supervised learning) used by the item matching module 208 to detect matches. The machine learning algorithm may be trained on training data from storage repository 212. The training data may include a set of training examples representing known matches. For example, the training data may include sets of paired data comprising an input object, e.g., a SKU or other merchant item information, and a desired output value (often referred to as a "label"), e.g., a CIN that matches the SKU. In some cases, the labeled training data is obtained from a human who manually classifies the data. As additional training data becomes available, the machine learning module 204 can update the machine learning algorithm, which advantageously can improve the accuracy of matches by the item matching module 208.

The example match engine 104 can include a task result evaluation engine 220, which will be described below with reference to FIG. 3. In this example, the task result evaluation engine 220 can provide significant amounts of labeled training data for use by the machine learning module 204, which may provide significant improvements in learning accuracy of the machine learning algorithm. Further, since obtaining manually labeled training data can be time-consuming and expensive, embodiments of the task result evaluation engine 220 which can provide labeled training data may advantageously reduce costs, improve efficiency, and enable more accurate learning algorithms to be generated by the machine learning module 204.

In other implementations, the match engine 104 can be configured with additional or alternative functionality. For example, the match engine 104 may be configured to automatically segment blocks of Asian characters into separate words (e.g., to determine a title of an item), to compare images (e.g., to determine whether a merchant's product image matches an image of a product available from the catalog system), or to recognize handwriting (e.g., to identify text, numbers, or a signature in an image of a payment check). The task result evaluation engine 220 can be used, for example, to provide additional training data for these additional functionalities or to evaluate the quality of the results of human or machine judges who may additionally or alternatively perform or assist with this functionality.

III. Example Task Result Evaluation Engine

Figure 3:
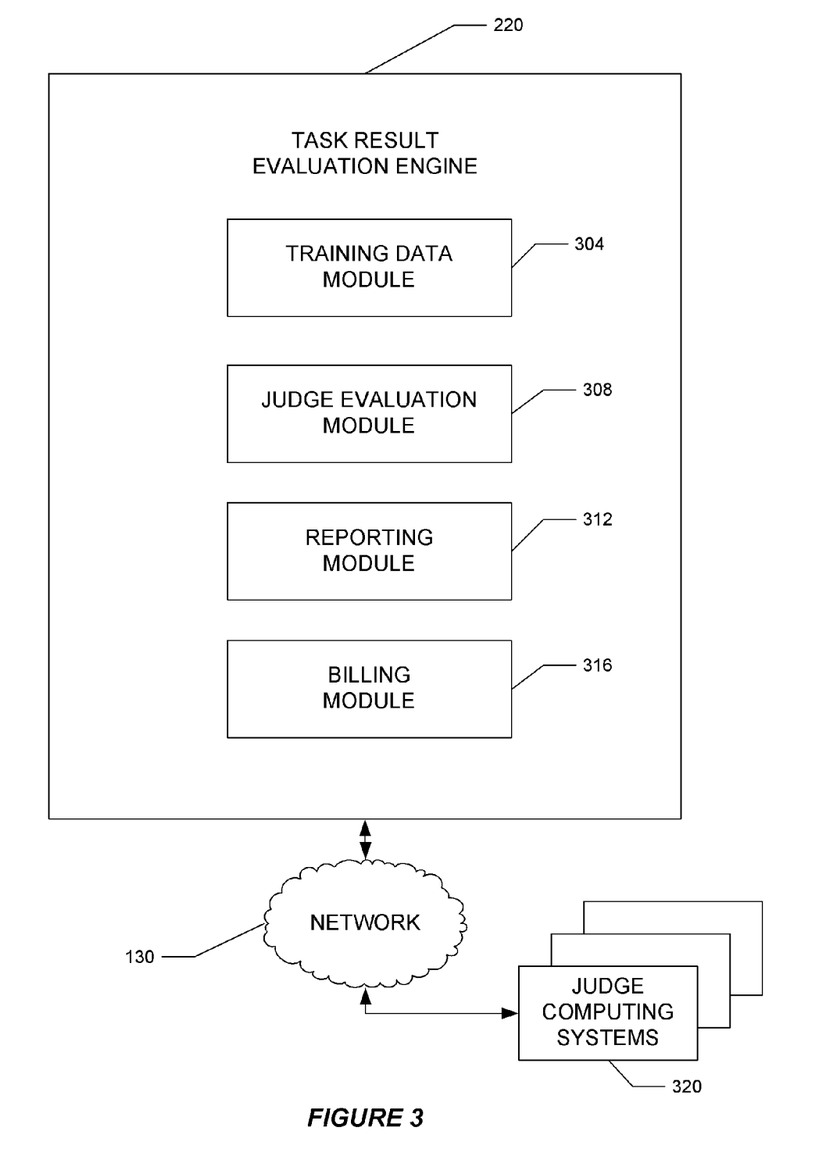
FIG. 3 is a block diagram that schematically illustrates an example of a task result evaluation engine configured to evaluate the results of judges who perform tasks.

FIG. 3 is a block diagram that schematically illustrates an example of the task result evaluation engine 220 that is configured to evaluate the results of judges (human or machine) who perform tasks. These tasks may include, but are not limited to, classification tasks (e.g., the item matching task described with reference to FIGS. 1 and 2), search tasks, pattern recognition, speech, text, or handwriting recognition, image, video, or music comparison, word segmentation, speech-to-text conversion, machine translation, natural language processing, lexical parsing, sequence labeling, syntactic analysis, and so forth.

The example task result evaluation engine 220 includes a training data module 304, a judge evaluation module 308, a reporting module 312, and a billing module 316. The task result evaluation engine 220 can receive task judging results from one or more judge computing systems 320 via the network 130. The task result evaluation engine 220 can communicate judging results (e.g., via the reporting module) to the judge computing systems via the network 130. The task result evaluation engine 220 may also communicate with other components of the electronic catalog system 100 via the network 130 or other suitable wired or wireless communication networks. In some implementations, the electronic catalog system 100 may provide a User Interface (UI) or Application Programming Interface (API) to enable judges or computing systems to communicate information to and from the task result evaluation engine 220.

In the example shown in FIG. 3, the training data module 304 can access task results provided by judges for analysis by the judge evaluation module 308. For example, the training data module 304 can receive task results from the judge computing systems 320 and may store the task results in local storage or memory. The training data module 304 may also communicate training data to the training data repository 212 for use by the machine learning module 204.

The judge evaluation module 308 accesses the task results and analyzes them via one or more algorithms described in further detail in Section IV. The judge evaluation module 308 may determine one or more quality metrics associated with a judge's task results. For example, the quality metrics may include accuracy, error rate, throughput of accurate results, speed (e.g., throughput per unit time), or a combination (e.g., weighted average) of such metrics. The judge evaluation module 308 may rank or rate judges based at least in part on the quality metrics. For example, judges may be ranked by error rate (e.g., smaller error rate may imply a better judge), by speed (e.g., higher speed may imply a better judge), or some other metric or combination of metrics. A judge who is ranked as "better" under one metric may not rank as highly under a different metric. For example, a judge who has a very low error rate but is very slow to complete tasks may rate more highly when ranked by error rate (or accuracy) than when ranked by speed or throughput. In some implementations, the judge evaluation module 308 can determine a set of "poor" judges (e.g., those who are ranked or have a quality metric below a threshold). Such judges might be removed from judging, replaced, or provided additional training or supervision. The judge evaluation module 308 can determine a set of "good" judges (e.g., those who are ranked or have a quality metric above a threshold) who might be rewarded (e.g., with an award, a promotion, higher compensation, or additional tasks).

The reporting module 312 can communicate results (e.g., quality metrics, judge evaluations, etc.) of the judge evaluation module 308 to the judges themselves, a judge review panel, or to other components of the catalog system 100. In some implementations, the reporting module 312 may provide feedback to the judges (e.g., quality metrics, ratings, or rankings) while the judges are working on a task, which may allow the judges to improve performance. The reporting module 312 may communicate this feedback to the judge computing systems 320 for display on a UI viewable by the judge. Such feedback may improve judging quality, because it may be motivating for a judge to see that the judge has moved from the 40th most accurate to the 10th most accurate judge. In some cases, the feedback is anonymous so that the judges may not know the particular judge associated with a particular quality metric, rating, or ranking.

The billing module 316 may determine a compensation rate for the judges based at least in part on the quality metrics, rankings, or ratings determined by the judge evaluation module 308. For example, a judge may be paid a certain amount or at a certain monetary rate for completing a task (e.g., 10 cents for each merchant item matched to a catalog item). In some implementations, the compensation may be adjusted or modified to account for one or more quality metrics (e.g., the judge may be compensated at least partly based on accuracy, error rate, throughput, or speed).

For some tasks, the judgments made by judges can have strong a priori probabilities. As one example, in an Asian language word segmentation task, a yes/no judgment is made at every pair of characters (e.g., "yes" this is a word break or "no" this is not a word break). As a majority of judgments generally will be "no", a judge who simply returned a "no" result for each pair of characters might rate highly when measured in accuracy or error rate, simply because a the "right" answer is generally "no". Accordingly, some embodiments determine quality metrics (or compensation) based at least in part on the a priori probabilities of the task results. For example, if a "no" is less common than a "yes", a "no" result may be weighted less than a "yes" result. In some such implementations, a logarithmic (or entropic) type of weighting can be used to provide a ranking measured in bits per judgment. Continuing with the foregoing example, if a "no" is 9 times as common as a "yes", then a "no" may be worth, for example, $-\log_2 0.9 \approx 0.15$ bits and a yes may be worth $-\log_2 0.1 \approx 3.3$ bits. In some such embodiments, the Kullback-Leibler divergence (or relative entropy) can be used to determine the bits per judgment, which corresponds roughly to the amount of information the judge's judgment provides beyond that expected based on the a priori task result probabilities. Thus, in some implementations, a judge may be paid by the "bit" and a judge's throughput may be measured in terms of bits per unit time (e.g., bits per hour) generated by the judge. The total information added by the judge can be determined by multiplying the judge's error rate (in bits per judgment) by the total number of judgments made by the judge. Further, since bits per judgment may reflect the information added by the judge, quality metrics measured in terms of bits per judgment may be effective at identifying judges (human or machine) that simply submit random results or the same result each time (e.g., results that add little or no information). In such cases, appropriate action may be taken (e.g., removing, replacing, or retraining the judge).

IV. Example Task Result Evaluation Algorithms

Various embodiments of the disclosed systems and methods can implement one or more of the algorithms discussed below. Such embodiments may use the task results obtained from multiple judges to provide an evaluation of each judge. Some such embodiments may enable analysis of the task results from multiple judges to provide judging evaluations in which, in effect, the judges judge themselves, because the judge evaluations (e.g., quality metrics) can be determined without recourse to evaluations from an external rating panel and/or without recourse to using a set of evaluation data (e.g., data known or assumed to be accurate) with which to compare the judges' task results. In some such embodiments, the algorithm may be based at least in part on assumptions including that "good" judges tend to agree with other "good" judges"; "good" judges tend to disagree with "poor" judges; and "poor" judges tend to disagree with other "poor" judges.

In various embodiments, the judge evaluation module 308 can be programmed to use one or more of the algorithms described below to evaluate task results obtained from multiple judges.

1. Example Algorithm Assuming Same Error Rate for all Judges

For this example algorithm, it is assumed that all judges make purely random errors, and that although judges may have different quality, no judges return task results with ill intent (e.g., there is no judge who just returns the same task result over and over or somehow tries to "game" the system).

In this embodiment, during the judging process, the same task data is sent to a pair of judges instead of one judge. The choice of the pair of judges to which the task data is sent may be randomized. In various implementations, a fraction f of the task data is sent to pairs of judges (and used for evaluating the judges), and the remaining fraction (1−f) is sent to a single judge for judgment. It may be advantageous if the judges do not know whether the task data is being duplicated and sent to another judge or whether the task data is just being sent to that particular judge. If the fraction f is too large (e.g., greater than about 50%), the judge evaluation can be inefficient (e.g., if f=1, every task is judged twice). Therefore, certain implementations may use a fraction f that is relatively small, e.g., f=0.01, f=0.05, f=0.10, f=0.15, f=0.20, or f=0.25.

Let e be the irreducible error rate, e.g., the error rate for good judges that is imposed by the inherent ambiguity in making a judgment for a task. In this illustrative example, the error rate e is assumed to be the same for all judges (see below for examples of algorithms that relax this assumption). When two judges judge the same task data, there are four possibilities for the outcomes, which are summarized in the following truth table:

TABLE 1

|  | Judge 1 Incorrect (probability e) | Judge 1 Correct (probability 1 − e) |
| --- | --- | --- |
| Judge 2 Incorrect (probability e) | $e^2$ | $e(1-e)$ |
| Judge 2 Correct (probability 1 − e) | $e(1-e)$ | $(1-e)^2$ |

The judge evaluation module 308 can analyze the results returned from pairs of judges who have judged the same task data ("overlapped judgments") and determine the judge error rate e. Let N be the number of overlapped judgments in a measurement of judge quality. The judge evaluation module 308 can determine whether a pair of judges agrees on the result or whether the pair of judges disagrees on the result. If there are D disagreements among the N overlapped judgments, and $e<(1-e)$, then it can be estimated that $D=2e(1-e)$ N, which can be solved for the judge error rate e:

$$e = \frac{1 - \sqrt{1 - \frac{2D}{N}}}{2}. \tag{1}$$

Equation (1) indicates that the judge error rate, in this example, can be determined from the ratio of judge disagreements D to overlapped judgments N, e.g., the judge error rate can be determined from the disagreement ratio, D/N. If the disagreement ratio is much less than 1 (e.g., the judges tend to agree with each other), then the judge error rate is approximately one-half the disagreement ratio (e.g., $e \approx D/2N$).

If 2D>N, then the judges are performing worse than chance overall (e.g., the error rate is above 50%). In this case, the error rate can be determined as:

$$e = \frac{1 + \sqrt{\frac{2D}{N} - 1}}{2}. \tag{2}$$

In some implementations, if 2D>N, the judge evaluation module 308, instead of returning the error rate from Equation (2), may assume that there may be a fault or problem with the judge evaluation or the task result data.

2. Example Algorithm for Determining Individualized Error Rates for Judges

In this example of a task result judging algorithm, individualized error rates can be determined for the judges from the results of tasks performed by the judges. If there are J judges, the error rate for the $i^{th}$ judge will be denoted by $e_i$, where i is an index between 1 and J. The judge evaluation module 308 can determine the number of disagreements, $D_i$, between the $i^{th}$ judge and all other judges given $N_i$ overlapped judgments. The total number of disagreements is D, and the total number of overlapped judgments is N.

An error rate $e_i^*$ represents an error rate estimated for all judges excluding the $i^{th}$ judge. In some embodiments, the error rate $e_i^*$ may be determined using algorithms generally similar to those described above in Section IV.1 (see, e.g., Eqns. (1) and (2)). For example, $$e_i^* = \begin{cases} \dfrac{1 - \sqrt{1 - \dfrac{2(D - D_i)}{N - N_i}}}{2}, & 2(D - D_i) \leq N - N_i \\ \dfrac{1 + \sqrt{\dfrac{2(D - D_i)}{N - N_i} - 1}}{2}, & 2(D - D_i) > N - N_i \end{cases} \quad (3)$$

A truth table showing the probabilities of outcomes for overlapped judgments between the $i^{th}$ judge and the $j^{th}$ judge can be estimated as shown in the following table:

TABLE 2

|  | Judge j ≠ i Incorrect (probability $e_i^*$) | Judge j ≠ i Correct (probability $1 - e_i^*$) |
| --- | --- | --- |
| Judge i Incorrect (probability $e_i$) | $e_i e_i^*$ | $e_i(1 - e_i^*)$ |
| Judge i Correct (probability $1 - e_i$) | $e_i^*(1 - e_i)$ | $(1 - e_i)(1 - e_i^*)$ |

An estimate for the number of disagreements between the $i^{th}$ judge and all other judges can be written as $D_i = N_i[e_i^*(1-e_i) + e_i(1-e_i^*)]$ which can be solved to obtain an estimate for the error rate $e_i$ for the $i^{th}$ judge:

$$e_i = \dfrac{\dfrac{D_i}{N_i} - e_i^*}{1 - 2e_i^*}. \quad (4)$$

If $e_i^*$ is greater than the disagreement ratio, $D_i/N_i$, for the $i^{th}$ judge, the estimate from Equation (4) can be negative. In such cases, the error rate can be limited to be in the range from [0,1].

In some implementations, the formulation described herein can be used to determine conditional errors for specific judgments, for example, the error rate given that the judge answered "yes" versus the error rate given that the judge answered "no" to a task question.

In other implementations, the systems and methods may determine individualized error rates, $e_i$, based at least in part on an analysis of disagreements among pairs of judges who judge overlapped data. A truth table showing the probabilities of outcomes for overlapped judgments between the $i^{th}$ judge and the $j^{th}$ judge is:

TABLE 3

|  | Judge j ≠ i Incorrect (probability $e_j$) | Judge j ≠ i Correct (probability $1 - e_j$) |
| --- | --- | --- |
| Judge i Incorrect (probability $e_i$) | $e_i e_j$ | $e_j(1 - e_i)$ |
| Judge i Correct (probability $1 - e_i$) | $e_i(1 - e_j)$ | $(1 - e_i)(1 - e_j)$ |

An estimate for the number of disagreements between the $i^{th}$ judge and all other judges can be written as $D_{ij} = N_{ij}[e_i(1-e_j) + e_j(1-e_i)]$, where $D_{ij} = D_{ji}$ is the number of disagreements between judge i and judge j among $N_{ij} = N_{ji}$ overlapped judgments. In some embodiments, the foregoing equation (for all i, j) can be solved to determine individualized error rates for each of the judges.

In other embodiments, assuming that any deviation from the foregoing estimate for $D_{ij}$ is random and that there is no collusion among the judges, the errors may be expected to have a Gaussian distribution. In some such embodiments, the individualized error rates for the judges can be determined by reducing (e.g., below a threshold) or minimizing the following sum:

$$\sum_{i,j \neq i} (D_{ij} - N_{ij}[e_i(1 - e_j) + e_j(1 - e_i)])^2. \quad (5)$$

In the sum shown in Equation (5), the case j=i is omitted, because judges are not overlapped with themselves. In other embodiments, the case j=i may not be omitted from the sum if judges are overlapped with themselves (e.g., to determine how consistently a particular judge judges the same task data).

The judge evaluation module 308 can determine the error rates, $e_i$, for i=1, . . . , J, by finding values of the error rates $e_i$ that minimize (or reduce to a sufficiently small value) the sum in Equation (5). In various embodiments, the judge evaluation module 308 can be programmed with one or more numerical methods for determining the error rates from Equation (5). For example, optimization algorithms can be used such as, e.g., search algorithms, gradient descent algorithms, to find a minimum (or sufficiently small value) of the sum in Equation (5). In some gradient descent algorithms, the algorithm takes steps of size γ toward the minimum of the sum. The algorithm can repeat taking steps until the minimum (or a sufficiently small value) of the sum is reached. The values of the $e_i$ at this point can be returned as the judge error rates.

In some gradient descent algorithms, the value of the step size γ can be determined as the value that minimizes the squared error $|f(e) - \gamma \nabla f(e)|^2$, where $e = \{e_1, e_2, \ldots, e_J\}$, f(e) is the sum in Equation (5), and $\nabla f(e)$ is the gradient of the sum. This squared-error equation can be reduced to a cubic equation for the step size γ, and in some implementations, the roots for γ can be found analytically. Because $0 \leq e_i \leq 1$ for all i, there may be constraints on the value of γ that lead to allowable values for the error rates. For example, the step size may be bounded in the closed range $[0, \gamma_1]$, where $\gamma_1$ is the minimum (over all i) of $e_i/g_i$ if $g_i > 0$ and $(1-e_i)/(-g_i)$ if $g_i < 0$, where $g_i$ is the value of the gradient at $e_i$. Each of the values of the step size γ can be tested to determine which step size returns the smallest value for the sum in Equation (5). This process can be iterated so that the routine "descends" toward the minimum value of the sum. The process can end when the minimum is reached (which may be indicated by the value γ=0), a sufficiently small value of the sum is reached, or converged values of the $e_i$ are found.

3. Example Algorithm for Determining Individualized Error Rates for Judges that Judge Tasks Having Multiple Outcomes In this example of a task result judging algorithm, individualized error rates $e_i$ can be determined for the J judges who evaluate tasks that have M possible outcomes (or labels). This algorithm may provide advantageous error rate estimates when the probabilities of the different outcomes are different from each other. For example, if the probabilities of the possible outcomes of a task for judging the color of a shoe are 80% for "black", 15% for "brown", and 5% for "red", then a judge who simply selects "black" for every shoe would achieve 80% accuracy simply by virtue of these probabilities.

The judge evaluation module 308 can implement an embodiment of the following algorithm to account for these probabilities.

In this example, the random variable Y is such that $P(Y=k)$ is the prior probability that a randomly drawn task should be designated with outcome k. The random variable $X_i$ is such that $P(X_i=k)$ is the prior probability that judge i, presented with a randomly drawn task, will designate the task with outcome k. Conditional probabilities will be denoted, for example, as $P(Y|X_i)$, which is the probability for the occurrence of Y given that $X_i$ occurs. Certain embodiments of the algorithm can determine Y, $X_i$, $P(Y|X_i)$, and $P(Y|X_i, X_j)$ using only overlapped judgments between pairs of judges.

In the following example, N represents the number of different tasks that are each judged by two different judges. The judge evaluation module 308 can compute the following counts shown in table:

TABLE 4

| | |
|---|---|
| $c_i$ | Total judgments by judge i |
| $c_{i,k}$ | Judgments of k by judge i |
| $c_{ij}$ | Total joint judgments by judges i and j |
| $c_{ij,kh}$ | Joint judgments by judges i and j with answers k and h, respectively |

Note that $c_{ij}=c_{ji}$ and $c_{ij,kh}=c_{ji,hk}$ so that there are $J(J-1)/2$ variables of the form $c_{ij}$, and there are $M^2 J(J-1)/2$ variables of the form $c_{ij,kh}$. In some implementations, the following estimates can be made: $P(X_i=k) \approx c_{i,k}/c_i$ and $$P(X_i, X_j) \approx P(X_i = k, X_j = h) \approx \frac{C_{ij,kh}}{C_{ij}}. \qquad (6)$$

In certain embodiments, the algorithm may assume that for $i \neq j$, $X_i$ and $X_j$ are conditionally independent, given Y. Because of the conditional independence assumption, the probabilities satisfy the following relationships:

$$P(X_i, X_j) = \sum_{l=1}^{M} P(X_i, X_j, Y = l)$$
$$= \sum_{l=1}^{M} P(X_i, X_j | Y = l) P(Y = l)$$
$$\sum_{l=1}^{M} P(X_i | Y = l) P(X_j | Y = l) P(Y = l).$$

Using Equation (6) and defining the following probability variables, $a_{i,kh}=P(X_i=k|Y=h)$ and $p_k=P(Y=k)$, the following approximation holds (and should approach equality as N becomes large):

$$c_{ij,kh} \approx c_{ij} \sum_{l=1}^{M} a_{i,kl} a_{j,hl} p_l. \qquad (7)$$

Some embodiments of the algorithm determine the values for the probabilities by minimizing the following sum:

$$\sum_{i,j,k,h} \left[ c_{ij,kh} - c_{ij} \sum_{l=1}^{M} a_{i,kl} a_{j,hl} p_l \right]^2. \qquad (8)$$

As discussed above with reference to Equation (5), Equation (8) can be solved using any type of optimization algorithm for determining or searching for minima of functions. For example, a gradient descent algorithm can be used to find the minimum (or a sufficiently small value) of the sum in Equation (8).

Because of the symmetries of the foregoing equations, there can be $M^2 J(J-1)/2$ equations, and because $$\sum_{k=1}^{M} p_k = \sum_{k=1}^{M} a_{i,kh} = 1,$$

there can be $J(M-1)^2+M-1$ unknowns to solve for. Since a well-defined solution may, in some cases, require more equations than unknowns, the following inequality may be satisfied $J \geq 2(M-1)^2/M^2+2/MJ$, which may be satisfied for $J \geq 3$.

In some example embodiments, initial conditions that are used to begin searching for the minimum of Equation (8) can be determined by assuming that all J judges are substantially optimal. In some such embodiments, $p_k$ can be approximated by $c_k/N$ and $c_{kh}$ can be approximated as $$c_{kh} \approx \sum_{l=1}^{M} a_{kl} a_{hl} p_l, \qquad (9)$$

where subscripts for individual judges have been dropped. In this example embodiment, since every judge is assumed to be optimal, the following relationship may apply: $a_{kh}p_h=a_{hk}p_k$, which can reduce the number of unknowns by a factor of two. Thus, the number of equations becomes $M(M+1)/2$ in the same number of unknowns in this example.

Accordingly, in some embodiments, Equation (9) can be solved to provide initial conditions for the solution of Equation (8). In some such embodiments, faster convergence may be achieved by initializing values for each judge under the assumption that all judges are initially equivalent, at which point there are M equations in M unknowns.

In some embodiments, a gradient descent algorithm that uses step sizes γ to "descend" toward the minimum can be used. In some such embodiments, possible values for the step size γ can be determined using concepts generally similar to those described above. For example, some embodiments select possible values of γ by minimizing:

$$\sum_{k \leq h} \left[ c_{kh} - \sum_{l=1}^{M} (a_{kl} - \gamma g_{kl})(a_{hl} - \gamma g_{hl}) p_l \right]^2,$$

where $g_{kl}$ is the gradient of Equation (8) with respect to $a_{kl}$.

In any of the algorithms disclosed herein, if there is a subset of some highly non-random or collusive judges, the error rate may not, in some cases, converge to be in a range from 0 to 1. In some such cases, the judge evaluation module 308 may drop a subset of the judges having disagreement ratios that are higher than other judges, and re-run the algorithm on the remaining judges. This process may, in some cases, be repeated until a converged set of error rates (in the range from 0 to 1) is determined.

In some implementations, if there is a fault, problem with the task result data, or some other type of abnormality (e.g., highly non-random judging results), the reporting module 312 may communicate a report, an alert, or a notification (e.g., electronic mail, text message, etc.) to an appropriate system component, data repository, or system manager indicating the type of problem encountered and that further investigation or intervention may be needed.

4. Summary of Example Algorithms for Determining Judge Error Rates

Accordingly, the foregoing example algorithms demonstrate that embodiments of the judge evaluation module 308 can determine the error rate of multiple judges without knowing which particular judgments were made in error. Thus, certain such embodiments can determine the error rate using only the task results received from the judges. In certain such embodiments, the judge error rate may be at least partly based on the disagreement ratio determined between pairs of judges who judge the same task data. Therefore, certain such embodiments can advantageously use the judges' own judgments to enable the "judges to judge themselves." Accordingly, the judge error rate may be determined without using a set of evaluation data (e.g., data known or assumed to be accurate) that is compared to the judges' task results to determine the error rate. Further, the judge error rate may be determined without using a (human) review panel to review and provide judgments about the quality of the judges' task results. This may be advantageous in cases in which none or few of the members of a review panel have sufficient expertise or experience to evaluate the performance of the judges (e.g., evaluating search engine results in languages understood by no member of the panel). Therefore, use of embodiments of the foregoing algorithms can enable fully automatic evaluations of multiple judges who provide judgments for one or more tasks.

V. Examples of Quality Metrics

In some embodiments, the reporting module 312 can communicate results (e.g., quality metrics, judge evaluations, ratings, rankings, etc.) determined by the judge evaluation module 308 to the judges themselves, a judge review panel, or to other components of the catalog system 100. The quality metrics can include, for example, error rate, accuracy rate (e.g., $1-e_i$), throughput, speed, or a combination of such (or similar) metrics. In various implementations, throughput measures the number of tasks judged or the number of tasks judged correctly. In some implementations, throughput is adjusted for the number of tasks judged incorrectly. For example, throughput may measure the number of tasks judged correctly minus the number of tasks judged incorrectly (e.g., so that every incorrect result cancels out a correct result). If the number of tasks judged is n and the error rate is e, this latter measure of throughput may be expressed as $n(1-2e)$. Speed may be determined as throughput per unit time (e.g., throughput per hour).

As described above, some implementations may use a logarithmic (or entropic) type of weighting to provide a quality metric that measures the amount of information added by the judge. For example, the quality metric may be measured in bits per judgment. In some such embodiments, the Kullback-Leibler divergence (or relative entropy) between X, and Y can be used to determine the bits per judgment. The billing module 316 may determine the amount or rate at which judges are paid based partly on the amount of information added by the judge (e.g., paid by the bit).

VI. Examples of Judge Evaluation Criteria

As described above, in some implementations, the judge evaluation module 308 analyzes the task results returned from pairs of judges who have judged the same task data ("overlapped judgments") to determine the judge error rate e (individual or average). In various implementations, one, some, or all of the following considerations can be implemented by the judge evaluation module 308.

In some implementations, each judge is overlapped with at least one other judge on at least some task data. For example, each judge may be overlapped with about 10%, 20%, 30%, 40%, 50%, 75%, or more of the judges on some task data. In some such implementations, each judge is overlapped with every (or nearly every) other judge on at least some tasks. For example, in some such implementations, if there are J judges, then $J(J-1)/2$ task judgments can be selected for overlap.

The overlapping can be randomized and made unpredictable so that a judge will not know whether a particular task is being evaluated, with whom the judge is being compared, or whether the judge is the first (or only) judge to judge the task. For example, it may be advantageous not to submit tasks in sequence (e.g., consecutive paragraphs from a book), because a judge may suspect that he or she is being evaluated if a non-sequential task is submitted to the judge. If there is a possibility of collusion among judges, the sense of the task questions asked of certain judges may be reversed as compared to the sense of the question asked of other judges. For example, for a pattern-matching problem where judges are asked if pattern A matches Pattern B, the questions can be randomized as to which questions is to be A and which is to be B. By reversing the sense of the question (and assuming that judges cannot compare the questions received), collusion among judges (e.g., all judges agree to select the first choice) can be reduced or eliminated.

In some implementations, new judges may be overlapped to a relatively high degree (e.g., from about 50% to about 100%) with one, some, or all of the existing or established judges during a probationary period. In some such implementations, the judge evaluation is performed on two sets of judges: a first set including all judges and a second set including only existing or established judges (e.g., not including new judges). Evaluation results from the first set can be used to evaluate the new judges, and evaluation results from the second set can be used to evaluate the existing or established judges. Existing or established judges may be placed on probation if one or more of their quality metrics drops below a threshold level. In some cases, judges on probation may not be paid or may be paid at a reduced rate or amount.

VII. Examples of Training Data for Use in Machine Learning Algorithms

As discussed above with reference to FIG. 2, the match engine 104 may use a set of training data (accessible from the repository 212) that the machine learning module 204 can use to train machine learning algorithms used, in this example context, to find electronic catalog items that match submitted merchant items. The ability of a machine learning algorithm to learn may depend on the quantity and quality of the training data; therefore, it may be advantageous to provide systems and methods that can provide significant quantities of training data and/or provide an indication as to the quality of the training data. Embodiments of the judging evaluation systems and methods disclosed herein can be used to generate and/or qualify training data. The systems and methods disclosed herein are illustrative and are not limited to the context of item matching in an electronic catalog and can generate and/or qualify training data for any type of machine learning algorithm.

The training data may include sets of paired data comprising an input object, e.g., a SKU for a merchant item, and a desired output value (often referred to as a "label"), e.g., a CIN that matches the SKU. The training data can be generated as the result of the task judgment process, for example, by associating a particular judge's judgment with the task question (e.g., judge i has determined that a merchant's submission of the "Zoomracer Running Shoe" with "SKU=3789" corresponds to the electronic catalog system's item with "CIN=7463").

In some implementations, a confidence score can be included with the training data. The confidence may include one or more values that represent the quality of the judge's judgment. The confidence score can be determined by the judge evaluation module 308. In one embodiment, the confidence score may simply be the particular judge's accuracy rate (e.g., $1-e_i$) for the task. Continuing with the above example, if the judge's error rate is 7%, the confidence score may be 93%, and the training data may be that the "Zoomracer Running Shoe" with "SKU=3789" corresponds to the electronic catalog system's item with "CIN=7463" with a 93% confidence score. Embodiments of certain machine learning algorithms can utilize the confidence score to provide improved learning based on the training data.

1. Example Algorithms for Qualifying Training Data with Confidence Scores

With reference to the example algorithm described in Section IV.3, certain embodiments can qualify training data as follows. If judge i assigns value k to an item, the confidence score can include a set of values (e.g., a vector) that may be representative of the probability distribution of possible outcomes of the judgments made by some or all of the judges. For example, the probability distribution may represent the likelihood of outcomes for the possible values associated with an item. In some embodiments, the confidence score includes values denoted as $v=\{v_h\}$ and can be determined as:

$$v_h = P(Y = h \mid X_i = k)$$
$$= \frac{P(X_i = k \mid Y = h)P(Y = h)}{P(X_i = k)}$$
$$= \frac{p_{i,kh} P_{i,h}}{c_{i,k}/c_i}.$$

The confidence score based on this set of values measures the probability that an ideal judge would label the item as h given that judge i labeled the item as k. Since there can be multiple possible outcomes for a judgment, the confidence score can include a plurality of values (e.g., the vector $v=\{v_h\}$). As discussed above, the plurality of values can represent the likelihoods of the outcomes based at least in part on the judgments by some (or all) of the judges. Continuing with the above example, the training data could be: ("SKU=3789" corresponds to: "CIN=7463" with 84% probability, to "CIN=7499" with 12% probability, and to "CIN=8843" with 4% probability).

In certain embodiments, tasks are judged by pairs of judges, and the confidence score can represent the probability that an ideal judge would label the item as h given that judge i labeled the item as k and judge j labeled the same item as l. The confidence score values can be determined from:

$$v_h = P(Y = h \mid X_i = k, X_j = l)$$
$$= \frac{P(X_i = k, X_j = l \mid Y = h)P(Y = h)}{P(X_i = k, X_j = l)}$$
$$= \frac{P(X_i = k \mid Y = h)P(X_j = l \mid Y = h)P(Y = h)}{P(X_i = k, X_j = l)}$$
$$= \frac{p_{i,kh} p_{j,lh} P_l}{c_{ij,kh}/c_{ij}}.$$

VIII. Example Methods for Evaluating Task Results from Multiple Judges

Figure 4:
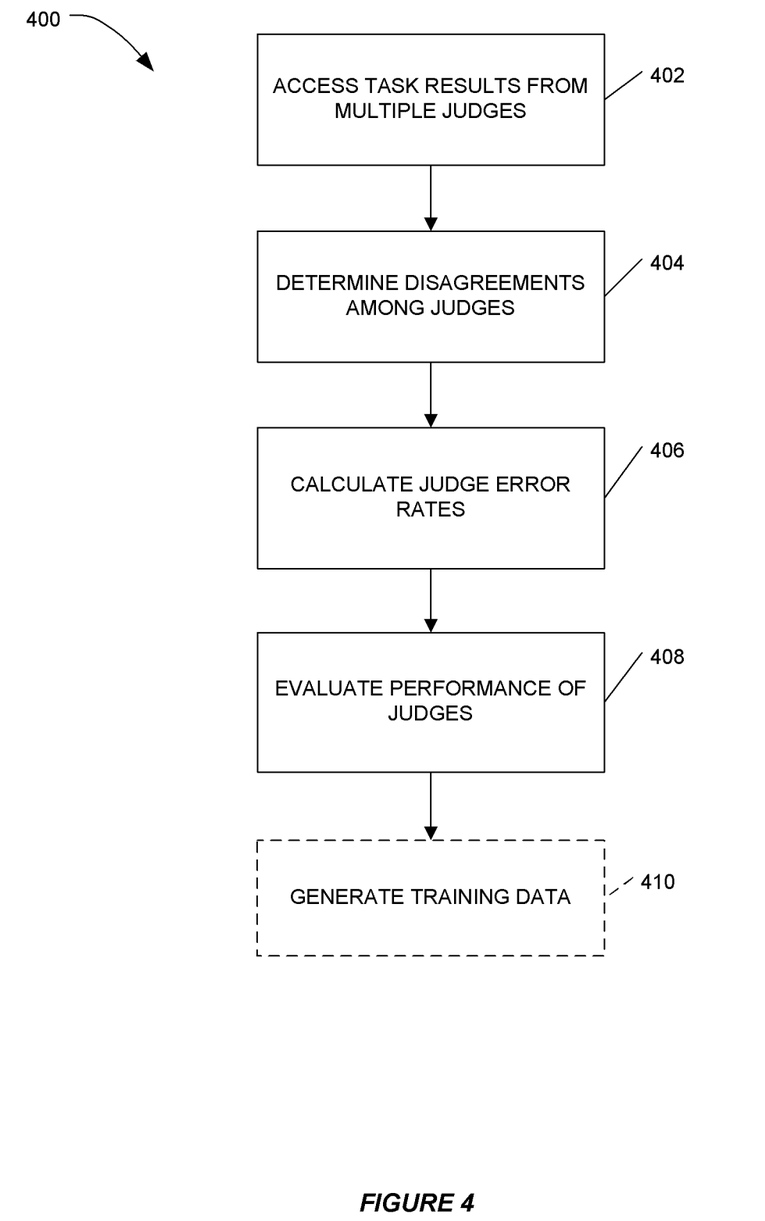
FIG. 4 is a flowchart that schematically illustrates an example of a method for evaluating the results of judges who perform tasks.

FIG. 4 is a flowchart that schematically illustrates an example of a method 400 for evaluating the results of judges who perform tasks. In some embodiments, the method 400 can be performed by the task result evaluation engine 220.

At block 402, the method 400 can access task results from multiple judges. The task results can include overlapped task data that was judged by more than one judge (e.g., a pair of judges). At block 404 the method 400 can determine disagreements among the judges who have judged the overlapped task data. For example, embodiments of the method 400 can determine disagreement ratios (e.g., $D_i/N_i$) or the counts from Table 4. At block 406, the method 400 can determine the judge error rates based at least in part on one or more of the algorithms described herein. At block 408, the method 400 can evaluate the judges by, for example, determining quality metrics, ratings, or rankings of the judges. The judge evaluations can be reported (e.g., via the reporting module 312) and payment amounts or rates can be determined (e.g., via the billing module 316).

Block 410 is an optional block and may be used if training data based on the task results accessed from the judges is to be generated. The training data may (optionally) include confidence scores that indicate the quality of the task results. The training data can be stored by the data repository 212 and used by the machine learning module 204 to improve the quality of the machine learning algorithms used by the item matching module 208. Certain such embodiments can advantageously provide improved machine learning algorithms that better identify matches between merchant-submitted item information and item information in the electronic catalog system 100. Improved machine learning algorithms can reduces costs and improve efficiency of the electronic catalog system in adding new merchant items to the catalog of items available for purchase by users. Cost savings beneficially may be passed on to customers of the electronic catalog system 100 who purchase items from the catalog.

IX. Additional Examples of Task Result Evaluation

As discussed above, certain embodiments of the systems and methods described herein use only the task results from the judges to evaluate the judges. Certain such embodiments may determine the evaluations automatically, without human intervention. In other embodiments, additional information may be used to evaluate the judges. For example, in some embodiments, input from a review panel may be used to modify one or more quality metrics, ratings, or rankings. As one such example, the review panel may grade the judges on an evaluation scale (e.g., "negative", "neutral", or "positive"), and adjust a quality metric, rating, or ranking based at least in part on the grade (e.g., increase metric by 10% for "positive" grade, reduce metric by 10% for "negative" grade, and leave metric unchanged for "neutral" grade).

In some implementations, a set of task results that are known (or assumed) to be correct may included in the evaluations. Such task results may be thought of as a "gold" standard with which to evaluate the judges. In some such implementations, the gold standard set is included as if it were another judge to be evaluated. Thus, some or all of the other judges can be compared to the gold standard set as well as to other judges' task results by the judge evaluation module 308. In some implementations, task results obtained from high-quality judges (e.g., judges having a sufficiently low error rate) can be used to generate the gold standard set for a future project involving same or similar tasks.

X. Conclusion

Although generally described in the context of an electronic catalog system that evaluates the results of tasks performed by human judges, the features and processes described above can also be implemented in a variety of other environments. As some possible examples, some or all of the disclosed features can be implemented by systems in which certain tasks are outsourced to humans, e.g., crowdsourcing systems, collaborative innovation networks, human-based computation systems, marketplaces for human intelligence tasks (e.g., Mechanical Turk®), and so forth. Further, as described above, embodiments of the disclosed systems and methods can evaluate the results of tasks performed by humans and/or by machines. Embodiments of the systems and methods disclosed herein can be used to generate and qualify training data for use by machine learning algorithms.

Each of the processes, methods, and algorithms described in the preceding sections may be embodied in, and fully or partially automated by, code modules executed by one or more computers, computer systems, computer processors, machines, or hardware configured to execute computer instructions. The code modules may be stored on any type of non-transitory computer-readable medium or hardware computer storage device, such as hard drives, solid state memory, RAM, ROM, optical disc, and/or the like. The systems and modules may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The methods, processes, and algorithms may be implemented partially or wholly in application-specific circuitry, special purpose hardware, or a general purpose hardware computer system programmed to perform the methods, processes, or algorithms pursuant to instructions from program software. The results of the disclosed processes and process steps may be stored, persistently or otherwise, in any type of non-transitory, tangible computer storage such as, e.g., volatile or non-volatile storage.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y and Z," unless specifically stated otherwise, is understood with the context as used in general to convey that an item, term, element, etc. may be either X, Y or Z. Thus, such conjunctive language is not generally intended to imply that certain embodiments require at least one of X, at least one of Y and at least one of Z to each be present.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A method for evaluating results of tasks performed by multiple judges, the method comprising:
under control of a computer system comprising computer hardware:
accessing from physical computer storage task result data, the task result data comprising judgments made by multiple judges for tasks having a plurality of outcomes, the task result data including overlapped data for pairs of judges in which each of the judges in the pair of judges has provided a judgment of the same task as provided by the other judge in the pair of judges;
determining, from the overlapped data associated with each pair of judges, a number of overlapped judgments and a number of disagreements among the overlapped judgments for the pair of judges;

calculating, for each of the judges, an individualized error rate based at least in part on the determined numbers of disagreements and the determined numbers of overlapped judgments, wherein calculating the individualized error is based at least in part on differences between:
the determined number of disagreements between the pair of judges; and
an estimated number of disagreements between the pair of judges, the estimated number of disagreements based at least in part on the determined number of overlapped judgments for the pair of judges and the individualized error rates for each of the judges in the pair of judges;

generating, for each of the judges, a quality metric based at least in part on the individualized error rate calculated for the judge, the quality metric reflective of the quality of the judge's judgment of the tasks performed by the judge; and creating an electronic report in computer memory including the quality metric.

2. The method of claim 1, wherein calculating the individualized error is further based at least in part on probabilities of the plurality of outcomes of the tasks.

3. The method of claim 1, wherein calculating the individualized error rate comprises calculating a solution to an equation reflecting a sum of squared differences between the determined number of disagreements and the estimated number of disagreements.

4. The method of claim 3, wherein the equation is:

$$\sum_{i,j \ne i} (D_{ij} - N_{ij}[e_i(1-e_j) + e_j(1-e_i)])^2,$$

where:
$D_{ij}$ is the determined number of disagreements between judge i and judge j,
$N_{ij}$ is the determined number of overlapped judgments between judge i and judge j, and
$e_i$ and $e_j$ are the individualized error rates for judge i and judge j, respectively.

5. The method of claim 1, wherein the quality metric comprises at least one of an accuracy rate, a throughput, and a speed.

6. The method of claim 1, wherein the quality metric is based at least in part on the information added by the judge per judgment.

7. A system for evaluating results of tasks performed by multiple judges, the system comprising:
physical computer storage configured to store overlapped task data, the overlapped task data including information on judgments for tasks performed by pairs of judges in which each of the judges in the pair of judges has provided a judgment of the same task as provided by the other judge in the pair of judges; and
a physical computer system configured to communicate with the physical computer storage, the physical computer system configured to execute instructions to:
determine from the overlapped task data: (1) numbers of overlapped judgments and (2) numbers of disagreements among the overlapped judgments for the pairs of judges;
calculate an individualized error rate for each judge based at least in part on the determined numbers of disagreements and the determined numbers of overlapped judgments, wherein the individualized error rate calculated for each judge is calculated based at least in part on differences between:
the determined number of disagreements between a pair of judges; and
an estimated number of disagreements between the pair of judges, the estimated number of disagreements based at least in part on the determined number of overlapped judgments for the pair of judges and the individualized error rates for each of the judges in the pair of judges; and
generate an evaluation for each judge, the evaluation based at least in part on the individualized error rate for the judge.

8. The system of claim 7, wherein the tasks comprise a classification task, a pattern recognition task, a search task, or a word segmentation task.

9. The system of claim 7, wherein each of the tasks comprises at least two outcomes for judgment by a judge.

10. The system of claim 9, wherein the individualized error rate calculated for each judge is further based at least in part on probabilities of the at least two outcomes.

11. The system of claim 7, wherein the individualized error rate calculated for each judge is calculated by reducing or minimizing a sum of the squared differences.

12. The system of claim 7, wherein the evaluation comprises a quality metric, a rating, or a ranking of the judge.

13. The system of claim 7, wherein the physical computer system is further configured to determine a payment for each judge, the payment based at least in part on the individualized error rate determined for the judge.

14. The system of claim 13, wherein the payment reflects an amount of information added by the judge in performing the judgments.

15. A system for generating training data for use with a machine learning algorithm, the system comprising:
physical computer storage configured to store task result data, the task result data comprising judgments made by multiple judges for tasks having a plurality of outcomes, the task result data including overlapped data for pairs of judges in which each of the judges in the pair of judges has provided a judgment of the same task as provided by the other judge in the pair of judges; and
a physical computer system configured to communicate with the physical computer storage, the physical computer system configured to execute instructions to:
calculate an individualized error rate for each judge based at least in part on numbers of disagreements and numbers of overlapped judgments determined from the overlapped task data;
determine a confidence score for a task result provided by a judge, the confidence index based at least in part on the individualized error rate calculated for the judge and a probability distribution representing likelihoods of one or more outcomes for the task; and
generate training data that comprises the task result and the confidence score.

16. The system of claim 15, wherein the confidence score comprises the error rate.

17. The system of claim 15, wherein the confidence score for a task result provided by the judge is determined to reflect a probability that an ideal judge would judge the task as having a first outcome given that the judge judged the task as having a second outcome, the first outcome not necessarily different from the second outcome.

18. The system of claim 17, wherein the probability is further contingent on a second judge having judged the task as having a third outcome, the third outcome not necessarily different from the first outcome or the second outcome.

19. The system of claim 15, wherein the physical computer system is further configured to store the training data in the physical computer storage.

* * * * *